(12) United States Patent
Sun et al.

(10) Patent No.: US 10,728,059 B1
(45) Date of Patent: Jul. 28, 2020

(54) PARALLEL MIXED-SIGNAL EQUALIZATION FOR HIGH-SPEED SERIAL LINK

(71) Applicant: CREDO TECHNOLOGY GROUP LIMITED, Grand Cayman (KY)

(72) Inventors: Junqing Sun, Fremont, CA (US); Haoli Qian, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 16/459,512

(22) Filed: Jul. 1, 2019

(51) Int. Cl.
*H04L 25/03* (2006.01)

(52) U.S. Cl.
CPC .. *H04L 25/03318* (2013.01); *H04L 25/03305* (2013.01); *H04L 2025/03363* (2013.01)

(58) Field of Classification Search
CPC ......... H04L 25/03318; H04L 25/03305; H04L 2025/03363
See application file for complete search history.

(56) References Cited

U.S. PATENT DOCUMENTS

| | | | |
|---|---|---|---|
| 5,420,587 | A | 5/1995 | Michel |
| 5,936,566 | A | 8/1999 | Park |
| 6,002,356 | A | 12/1999 | Cooper |
| 6,192,072 | B1 | 2/2001 | Azadet et al. |
| 7,239,652 | B2 | 7/2007 | Parhi |
| 7,333,580 | B2 | 2/2008 | Parhi |
| 7,505,695 | B2 | 3/2009 | Sugihara et al. |
| 7,522,899 | B1 | 4/2009 | He |
| 7,574,146 | B2 | 8/2009 | Chiang et al. |
| 7,577,892 | B1 | 8/2009 | He |
| 7,646,833 | B1 | 1/2010 | He et al. |
| 7,684,778 | B1 | 3/2010 | Qian et al. |
| 7,688,968 | B1 | 3/2010 | Chen et al. |
| 7,733,246 | B2 | 6/2010 | Feng et al. |
| 7,773,017 | B1 | 8/2010 | He et al. |
| 7,813,702 | B1 | 10/2010 | He |
| 7,826,576 | B1 | 11/2010 | He et al. |
| 7,853,855 | B1 | 12/2010 | He |
| 7,933,341 | B2 | 4/2011 | Agazzi et al. |

(Continued)

FOREIGN PATENT DOCUMENTS

CN 108781195 A 11/2018

OTHER PUBLICATIONS

U.S. Non-Final Office Action dated Apr. 23, 2014 in U.S. Appl. No. 13/594,595.

(Continued)

*Primary Examiner* — Dac V Ha
(74) *Attorney, Agent, or Firm* — Ramey & Schwaller LLP; Daniel J. Krueger

(57) ABSTRACT

A receiver embodiment has an equalizer that includes: an array of sample and hold elements, an array of linear equalizers, and an array of decision elements. Each sample and hold element in the array periodically samples an analog receive signal with a respective phase to provide an associated held signal. Each linear equalizer in the array forms a periodically-updated weighted sum of the held signals from the array of sample and hold elements. Each decision element in the array derives at least one sequence of symbol decisions based on at least one of the periodically-updated weighted sums. The resulting sequences of symbol decisions are output in parallel.

16 Claims, 5 Drawing Sheets

(56) References Cited

U.S. PATENT DOCUMENTS

| | | | |
|---|---|---|---|
| 7,987,396 | B1 | 7/2011 | Riani et al. |
| 7,999,711 | B1 | 8/2011 | He et al. |
| 8,023,920 | B1 | 9/2011 | Qian et al. |
| 8,031,765 | B1 | 10/2011 | He |
| 8,059,773 | B1 | 11/2011 | He et al. |
| 8,077,859 | B1 | 12/2011 | Xiaopeng et al. |
| 8,175,565 | B1 | 5/2012 | He |
| 8,184,802 | B1 | 5/2012 | Xiaopeng et al. |
| 8,203,975 | B1 | 6/2012 | Chen et al. |
| 8,276,052 | B1 | 9/2012 | Riani et al. |
| 8,301,036 | B2 | 10/2012 | He |
| 8,699,558 | B1 | 4/2014 | Wang |
| 8,971,396 | B1 | 3/2015 | Bates et al. |
| 9,071,479 | B2 | 6/2015 | Qian et al. |
| 9,571,309 | B1 | 2/2017 | Sakai |
| 9,667,454 | B1 | 5/2017 | Koba et al. |
| 9,699,007 | B2 | 7/2017 | Ho |
| 2002/0007474 | A1 | 1/2002 | Fujita et al. |
| 2003/0108113 | A1 | 6/2003 | He et al. |
| 2003/0123579 | A1 | 7/2003 | Safavi et al. |
| 2004/0196017 | A1 | 10/2004 | Sutardja et al. |
| 2005/0190868 | A1 | 9/2005 | Khandekar et al. |
| 2005/0259766 | A1 | 11/2005 | Chen |
| 2007/0047637 | A1* | 3/2007 | Lee ............... H04L 25/03057 375/233 |
| 2007/0063882 | A1 | 3/2007 | Feng et al. |
| 2007/0067704 | A1 | 3/2007 | Altintas et al. |
| 2008/0253438 | A1 | 10/2008 | Riani et al. |
| 2009/0010320 | A1 | 1/2009 | Hollis |
| 2010/0098042 | A1 | 4/2010 | Dent |
| 2010/0322359 | A1* | 12/2010 | Stockmanns .... G11B 20/10009 375/341 |
| 2011/0069791 | A1 | 3/2011 | He |
| 2011/0116806 | A1 | 5/2011 | He |
| 2012/0027074 | A1 | 2/2012 | Raghavan et al. |
| 2012/0057626 | A1* | 3/2012 | Zhong ............... H04L 7/0087 375/233 |
| 2012/0207247 | A1 | 8/2012 | Cheng |
| 2013/0259112 | A1* | 10/2013 | Bae ............... H04L 25/03891 375/232 |
| 2015/0016497 | A1* | 1/2015 | Aziz ............... H04L 25/03057 375/233 |
| 2015/0312056 | A1 | 10/2015 | Zhang et al. |
| 2016/0182259 | A1 | 6/2016 | Musah et al. |
| 2017/0019275 | A1* | 1/2017 | Norimatsu ............ H04L 25/03 |
| 2020/0076651 | A1 | 3/2020 | Sun et al. |

OTHER PUBLICATIONS

U.S. Final Office Action dated Jul. 27, 2012 in U.S. Appl. No. 12/565,817.
U.S. Non-Final Office Action dated Nov. 17, 2014 in U.S. Appl. No. 13/594,595.
U.S. Non-Final Office Action dated Jan. 30, 2012 in U.S. Appl. No. 12/565,817.
U.S. Non-Final Office Action dated Sep. 11, 2012 in U.S. Appl. No. 13/027,625.
U.S. Notice of Allowability dated Jun. 26, 2012 in U.S. Appl. No. 12/618,735.
Black, Peter J. et al. "A 1-Gb/s, Four-State, Sliding Block Viterbi Decoder", IEEE Journal of Solid-State Circuits, vol. 32, No. 6, Jun. 1997, pp. 797-805.
Gredshishchev, Yuriy M. et al., "A 40GS/s 6b ADC in 65nm CMOS", ISSCC 2010/Session 21/Successive-Approximation ADCs/ 21.7, 2010 IEEE International Solid-State Circuits Conference, 390-392.
U.S. Notice of Allowability dated Apr. 15, 2015 in U.S. Appl. No. 13/594,595.
U.S. Notice of Allowability dated Nov. 15, 2017 in U.S. Appl. No. 15/285,272.
U.S. Non-Final dated Aug. 15, 2017 in U.S. Appl. No. 15/285,272.
International Search Report and Written Opinion dated Oct. 27, 2017 in International Application PCT/US2017/055082.
International Preliminary Report on Patentability dated Apr. 9, 2019 in International Application PCT/US2017/055082.
U.S. Notice of Allowability dated Sep. 30, 2013 in U.S. Appl. No. 12/565,817.

* cited by examiner

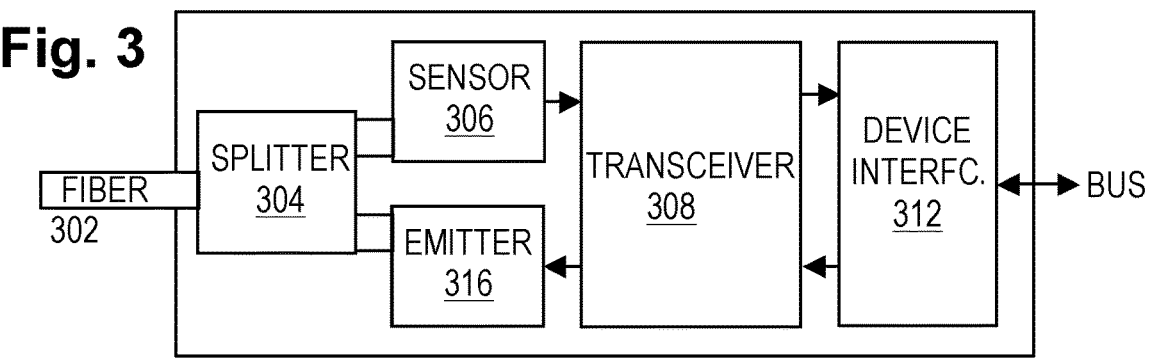
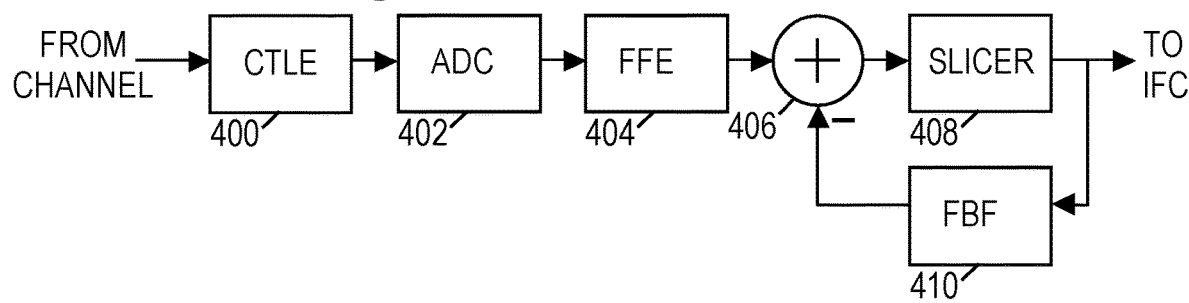
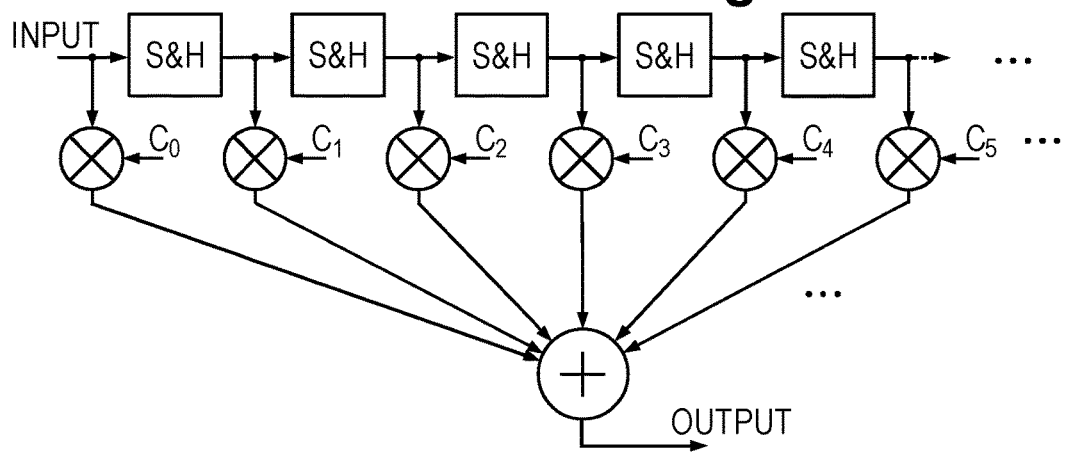

- SLICER T2
- SLICER E1
- SLICER T1
- SLICER E0
- SLICER T0

PARALLEL MIXED-SIGNAL EQUALIZATION FOR HIGH-SPEED SERIAL LINK

BACKGROUND

Digital communications occur between sending and receiving devices over an intermediate communications medium, or "channel" (e.g., a fiber optic cable or insulated copper wires). Each sending device typically transmits symbols at a fixed symbol rate, while each receiving device detects a (potentially corrupted) sequence of symbols and attempts to reconstruct the transmitted data. A "symbol" is a state or significant condition of the channel that persists for a fixed period of time, called a "symbol interval." A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by a sequence of two or more symbols.

Many digital communication links use only one bit per symbol; a binary '0' is represented by one symbol (e.g., an electrical voltage or current signal within a first range), and a binary '1' by another symbol (e.g., an electrical voltage or current signal within a second range), but higher-order signal constellations are known and frequently used. In 4-level pulse amplitude modulation (PAM4), each symbol interval may carry any one of four symbols, denoted as −3, −1, +1, and +3. Two binary bits can thus be represented by each symbol.

Channel non-idealities produce dispersion which may cause each symbol to perturb its neighboring symbols, a consequence termed "inter-symbol interference" (ISI). ISI can make it difficult for the receiving device to determine which symbols were sent in each interval, particularly when such ISI is combined with additive noise.

To combat noise and ISI, receiving devices may employ various equalization techniques. Linear equalizers generally have to balance between reducing ISI and avoiding noise amplification. Decision Feedback Equalizers (DFE) are often preferred for their ability to combat ISI without inherently amplifying the noise. As the name suggests, a DFE employs a feedback path to remove ISI effects derived from previously-decided symbols. Whichever equalizer is used must contend with ever-increasing levels of ISI, and must complete their processing in ever-decreasing symbol intervals. As symbol rates reach into the tens of gigabaud over long-reach channels, existing receiver designs are unable to adequately cope with this challenge.

SUMMARY

Accordingly, there is provided herein a receiver embodiment having an equalizer that includes: an array of sample and hold elements, an array of linear equalizers, and an array of decision elements. Each sample and hold element in the array periodically samples an analog receive signal with a respective phase to provide an associated held signal. Each linear equalizer in the array forms a periodically-updated weighted sum of the held signals from the array of sample and hold elements. Each decision element in the array derives at least one sequence of symbol decisions based on at least one of the periodically-updated weighted sums. The resulting sequences of symbol decisions are output in parallel.

One embodiment of an equalization method includes: providing an array of sample and hold elements to each periodically sample an analog receive signal with a respective phase to yield a held signal; coupling the held signals to an array of linear equalizers, each linear equalizer combining the held signals to form a periodically-updated weighted sum; and providing an array of decision elements to each derive at least one sequence of symbol decisions based on at least one of the periodically-updated weighted sums, the resulting sequences of symbol decisions arranged for parallel output.

Another equalization method embodiment includes: periodically sampling an analog receive signal with an array of sample and hold elements, each sample and hold element providing a held signal with a respective phase; forming weighted sums of the held signals with each linear equalizer in an array of linear equalizers; combining each of the weighted sums with a respective feedback signal to form combined signals; and deriving sequences of symbol decisions from each of the combined signals using an array of decision elements.

Each of the foregoing embodiments may be implemented individually or conjointly, and together with any one or more of the following features in any suitable combination: 1. an array of feedback filters, each feedback filter forming a periodically-updated feedback signal to be combined with a respective weighted sum, the feedback signals being derived from the sequences of symbol decisions, and the decision elements operating on the combined signals to derive the sequences of symbol decisions. 2. each decision element is multiplexed to derive sequences of symbol decisions based on weighted sums from multiple linear equalizers in the array of linear equalizers. 3. a second array of sample and hold elements to reduce loading of the analog receive signal by the first array of sample and hold elements. 4. a continuous time linear equalizer that filters an analog input signal to form the analog receive signal. 5. each of the decision elements in the array of decision elements employs at least three thresholds to derive symbol decisions for a PAM4 signal constellation. 6. each of the decision elements further includes at least one error threshold to derive an error signal for timing recovery. 7. configuring an array of feedback filters to each form a periodically-updated feedback signal to be combined with a respective weighted sum for input to one of the decision elements. 8. multiplexing each decision element to derive multiple sequences of symbol decisions based on weighted sums from multiple linear equalizers in the array of linear equalizers. 9. arranging for a second array of sample and hold elements to reduce loading of the analog receive signal by the first array of sample and hold elements.

BRIEF DESCRIPTION OF THE DRAWINGS

FIG. 3 is a block diagram of an illustrative fiber optic interface module.

FIG. 4 is a block diagram of an illustrative digital decision feedback equalizer (DFE) implementation.

FIG. 5 is a block diagram of an illustrative mixed-signal linear equalizer implementation.

DETAILED DESCRIPTION

Figure 1:
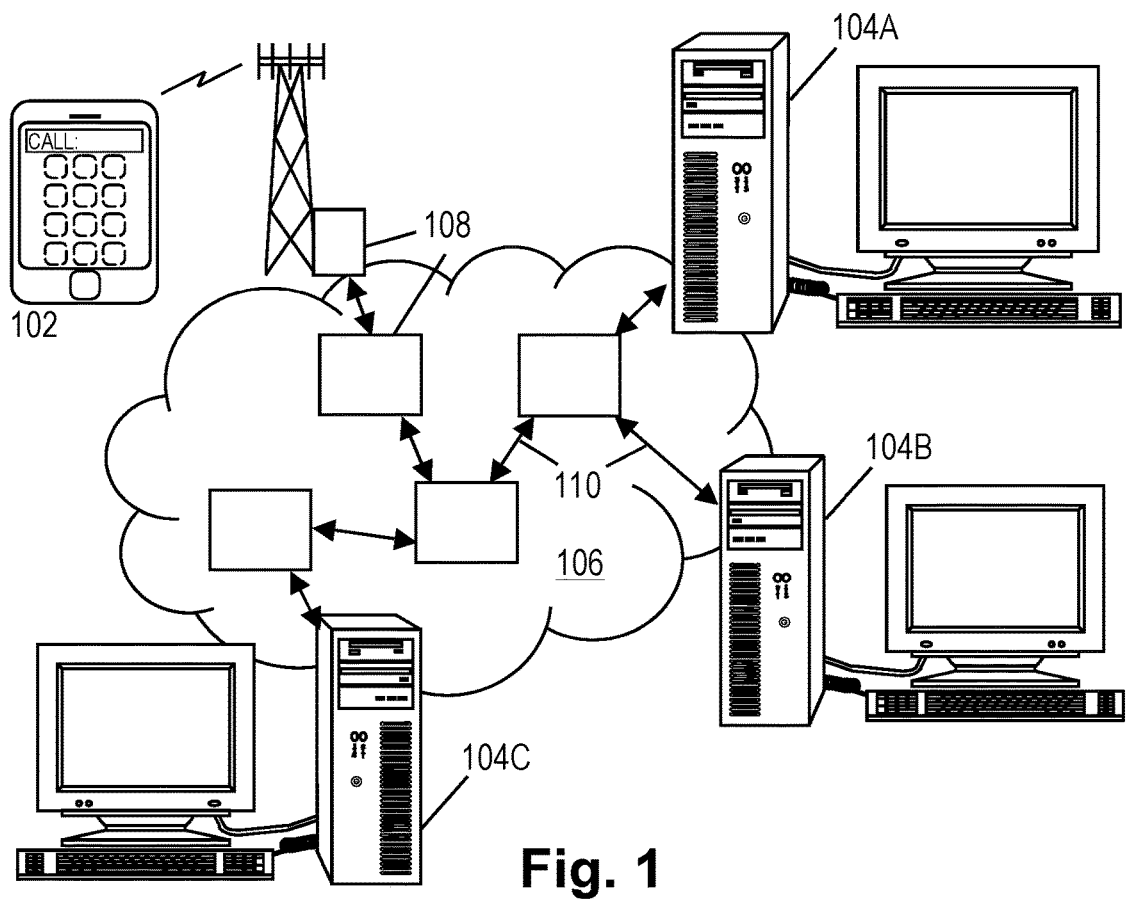
FIG. 1 shows an illustrative computer network.

Note that the specific embodiments given in the drawings and following description do not limit the disclosure. On the contrary, they provide the foundation for one of ordinary skill to discern the alternative forms, equivalents, and modifications that are encompassed in the claim scope.

The disclosed apparatus and methods are best understood in the context of the larger environments in which they operate. Accordingly, FIG. 1 shows an illustrative communications network 100 including mobile devices 102 and computer systems 104A-C coupled via a routing network 106. The routing network 106 may be or include, for example, the Internet, a wide area network, or a local area network. In FIG. 1, the routing network 106 includes a network of equipment items 108, such as switches, routers, and the like. The equipment items 108 are connected to one another, and to the computer systems 104A-C, via point-to-point communication links 110 that transport data between the various network components.

Figure 2:
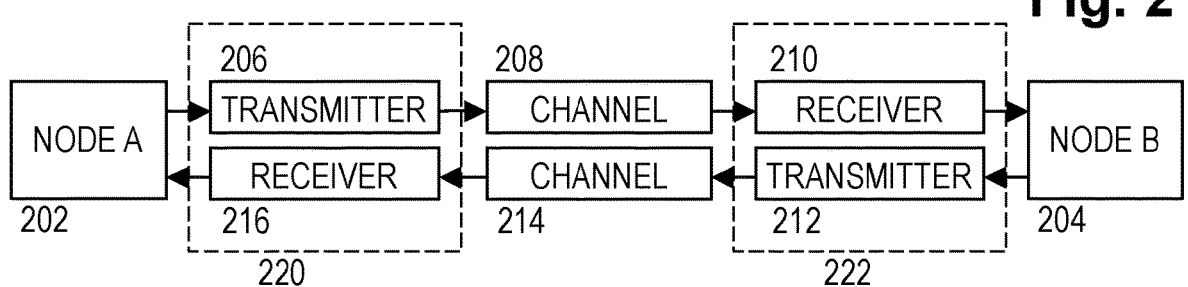
FIG. 2 is a block diagram of an illustrative point-to-point communication link.

FIG. 2 is a diagram of an illustrative point-to-point communication link that may be representative of links 110 in FIG. 1. The illustrated embodiment includes a first node 202 ("Node A") in communication with a second node 204 ("Node B"). Nodes A & B can each be, for example, any one of mobile devices 102, equipment items 108, computer systems 104A-C, or other sending/receiving devices suitable for high-rate digital data communications.

Coupled to Node A is a transceiver 220, and coupled to Node B is a transceiver 222. Communication channels 208 and 214 extend between the transceivers 220 and 222. The channels 208 and 214 may include, for example, transmission media such as fiber optic cables, twisted pair wires, coaxial cables, backplane transmission lines, and wireless communication links. (It is also possible for the channel to be a magnetic or optical information storage medium, with the write-read transducers serving as transmitters and receivers.) Bidirectional communication between Node A and Node B can be provided using separate channels 208 and 214, or in some embodiments, a single channel that transports signals in opposing directions without interference.

A transmitter 206 of the transceiver 220 receives data from Node A and transmits the data to the transceiver 222 via a signal on the channel 208. The channel signal may be, for example, an electrical voltage, an electrical current, an optical power level, a wavelength, a frequency, or a phase value. A receiver 210 of the transceiver 222 receives the signal via the channel 208, uses the signal to reconstruct the transmitted data, and provides the data to Node B. Similarly, a transmitter 212 of the transceiver 222 receives data from Node B, and transmits the data to the transceiver 220 via a signal on the channel 214. A receiver 216 of the transceiver 220 receives the signal via the channel 214, uses the signal to reconstruct the transmitted data, and provides the data to Node A.

FIG. 3 shows an illustrative transceiver embodiment in the context of a fiber optic interface module. An optical fiber 302 couples to the fiber optic interface module via a splitter 304 which creates two optical paths to the fiber: one for receiving and one for transmitting. A sensor 306 is positioned on the receiving path to convert one or more received optical signals into corresponding analog (electrical) receive signals that are equalized and demodulated by a receiving portion of transceiver 308 to provide a sequence of symbol decisions to a device interface 312. The device interface 312 buffers the sequence of symbol decisions and, in at least some embodiments, includes forward error correction (FEC) decoding and payload extraction logic to derive a received data stream from the sequence of symbol decisions. The device interface 312 then makes the received data stream available to the host node via an internal data bus in accordance with a standard I/O bus protocol.

Conversely, data for transmission can be communicated by the host node via the bus to device interface 312. In at least some embodiments, the device interface 312 packetizes the data with appropriate headers and end-of-frame markers, optionally adding a layer of FEC coding and/or a checksum. A transmit portion of transceiver 308 accepts a transmit data stream from interface 312 and converts the transmit data stream into an analog electrical drive signal for emitter 316, causing the emitter to generate optical channel signals that are coupled via splitter 304 to the optical fiber 302.

In at least some contemplated embodiments, elements 308-312 are integrated into a monolithic transceiver chip together with a controller that provides link training and flow control logic. Additional detail for such embodiments is provided in application U.S. App. 62/723,701, "SerDes pre-equalizer having efficient adaptation", which is hereby incorporated herein by reference in its entirety. Alternatively the device interface 312 may incorporate the controller functionality. Regardless, the transceiver may be employed for communications over optical fiber, electrical conductors, wireless links, or other channel types.

The receive portion of transceiver 308 performs equalization to combat intersymbol interference (ISI) that results from signal dispersion in the channel. FIG. 4 shows an illustrative implementation of the receive chain. The analog channel signal is filtered by a continuous time linear equalizer (CTLE) to attenuate out-of-band noise and perhaps provide some spectral shaping to improve a response to high-frequency components of the receive signal. An analog-to-digital converter (ADC) 402 may be provided to optionally digitize the receive signal, and if so, a digital feed-forward equalizer (FFE) 404 performs further equalization to further shape the overall channel response of the system and minimize the effects of leading ISI on the current symbol. As part of the shaping of the overall channel response, the FFE 404 may also be designed to shorten the channel response of the filtered signal while minimizing any attendant noise enhancement. In the absence of ADC 402, FFE 404 may perform analog filtering.

A summer 406 subtracts a feedback signal from the output of FFE 404 to minimize the effects of trailing ISI on the current symbol, yielding an equalized signal that is coupled to a decision element ("slicer") 408. The decision element includes one or more comparators that compare the equalized signal to corresponding decision thresholds to determine for each symbol interval which constellation symbol the signal's value most closely corresponds to. The equalized signal may also be termed a "combined signal" herein.

The decision element 408 accordingly produces a sequence of symbol decisions (denoted Ak, where k is the time index). In certain contemplated embodiments, the signal constellation is a bipolar (non-return-to-zero) constellation representing −1 and +1, necessitating one comparator using a decision threshold of zero. In certain other contemplated embodiments, the signal constellation is a PAM4 (−3, −1, +1, +3), necessitating three comparators employing the respective decision thresholds −2, 0, and +2. (The unit for expressing symbol and threshold values is omitted for generality, but for explanatory purposes may be presumed to be volts. In practice, a scale factor will be employed.) The comparator outputs can be taken collectively as a thermometer-coded digital representation of the output symbol decision, e.g., with 000 representing −3, 100 representing −1, 110 representing +1, and 111 representing +3. Alternatively, the comparator outputs could be converted into a binary or Gray-coded representation.

A feedback filter (FBF) 410 derives the feedback signal using a series of delay elements (e.g., latches, flip flops, or registers) that store the recent output symbol decisions ($A_{k-1}$, $A_{k-2}$, ..., $A_{k-N}$, where N is the number of filter coefficients Fi). Each stored symbol is multiplied with a corresponding filter coefficient Fi, and the products are combined to obtain the feedback signal.

As an aside, we note here that the receiver also includes a timing recovery unit and a filter coefficient adaptation unit, but such considerations are addressed in the literature and are well known to those skilled in the art. Nevertheless we note here that at least some contemplated embodiments include one or more additional comparators in the decision element 408 to be employed for comparing the combined signal to one or more of the symbol values, thereby providing an error signal that can be used for timing recovery with, e.g., a "bang-bang" design. We further note that the adaptation unit may employ the error signal to adapt the coefficients of both FFE 404 and FBF 410 during a training phase when a known symbol sequence is employed. The decision element 408 may include additional comparators to "unroll" one or more taps of the feedback filter, providing speculative decisions to a multiplexing arrangement as described in, e.g., U.S. Pat. No. 8,301,036 ("High-speed adaptive decision feedback equalizer") and U.S. Pat. No. 9,071,479 ("High-speed parallel decision feedback equalizer"), which are each incorporated herein by reference in their entireties.

The ADC 402 may be omitted if the FFE 404 is configured to operate on an analog input signal as shown in FIG. 5. An input signal is supplied to a sequence of sample and hold (S&H) elements. A first of the S&H elements captures the input signal value once in each symbol interval while outputting the captured value from the preceding symbol interval. Each of the other S&H elements captures the held value from the preceding element, repeating the operation to provide increasingly-delayed input signal values. A set of multipliers scales each of the input values in the sequence, supplying the scaled values to a summer that outputs the sum of the scaled input values. This output is also referred to herein as a weighted sum.

Figure 6:
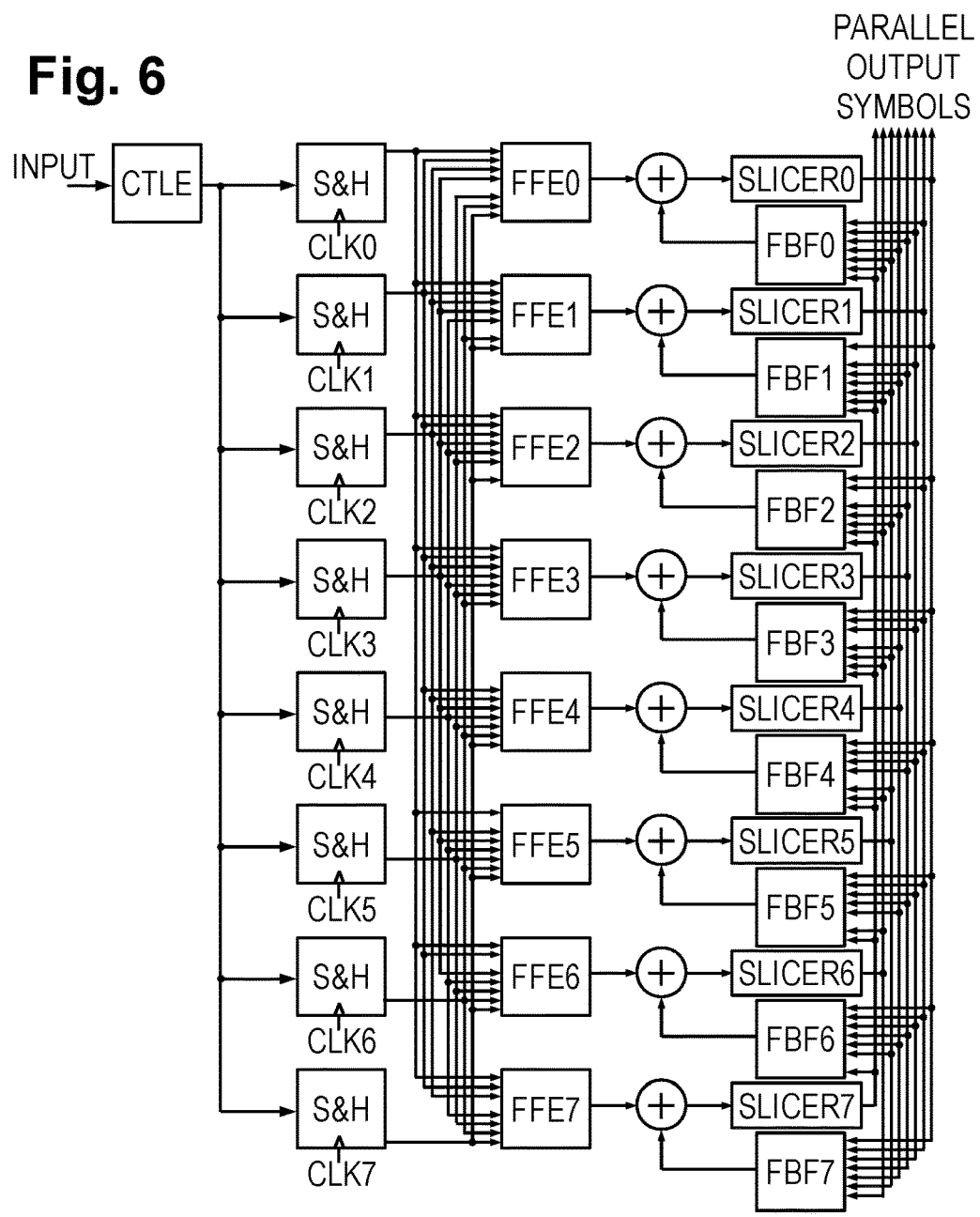
FIG. 6 is a block diagram of an illustrative parallel DFE including a parallelized mixed-signal linear equalizer.

The FFE of FIG. 5 requires a large number of operations to be performed in each symbol interval, which becomes increasingly challenging as the symbol interval grows ever smaller. FIG. 6 accordingly provides a parallelized version of the FFE (with parallelized decision elements and feedback filters as well).

Figure 7:
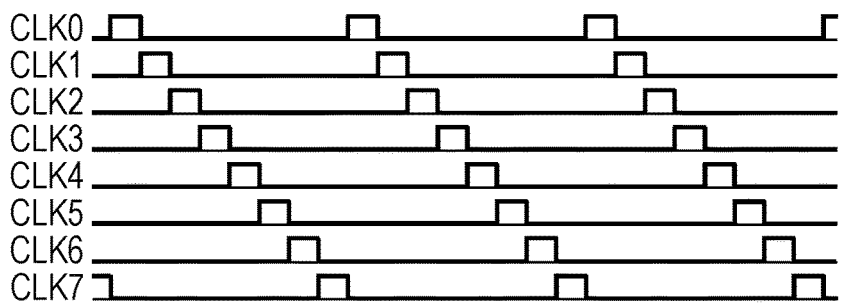
FIG. 7 is a timing diagram of clock signals for the parallelized mixed-signal equalizer.

In FIG. 6, the CTLE 400 filters the channel signal to provide the receive signal, which is supplied in parallel to an array of S&H elements. Each of the S&H elements is provided with a respective clock signal, each of the clock signals having a different phase, causing the elements in the array to take turns sampling the input signal, so that only one of the S&H element outputs is transitioning at any given time. See FIG. 7 for an illustration of how the clock signals are shifted in phase relative to each other. Note that the duty cycle shown is merely illustrative; the point meant to be conveyed by the diagram is the sequential nature of transitions in the different clock signals.

An array of FFEs (FFE0 through FFE7), each form a weighted sum of the S&H element outputs. The weighted sums employ filter coefficients that are cyclically shifted relative to each other. FFE0 operates on the held signals from the 3 S&H elements operating prior to CLK0, the S&H element responding to CLK0, and the 3 S&H elements operating subsequent to CLK0, such that during the assertion of CLK4, the weighted sum produced by FFE0 corresponds to the output of FFE 404 (FIGS. 4 and 5). FFE1 operates on the held signals from the 3 S&H elements operating prior to CLK1, the S&H element responding to CLK1, and the 3 S&H elements operating subsequent to CLK1, such that during the assertion of CLK5, the weighted sum corresponds to that of FFE 404. And the operation of the remaining FFEs in the array follows the same pattern with the relevant phase shifts. In practice, the number of filter taps may be smaller, or the number of elements in the array may be larger, so as to offer a longer window of valid output.

As with the receiver of FIG. 4, a summer may combine the output of each FFE with a feedback signal to provide an equalized signal to a corresponding decision element. FIG. 6 shows an array of decision elements (Slicer0 through Slicer7), each operating on an equalized signal derived from a respective FFE output. As with the decision element of FIG. 4, the illustrated decision elements employ comparators to determine which symbol the equalized signal most likely represents. The decisions are made while the respective FFE outputs are valid (e.g., Slicer0 operates while CLK4 is asserted, Slicer1 operates while CLK5 is asserted, etc). Preferably the decisions are provided in parallel on an output bus to enable a lower clock rate to be used for subsequent operations.

An array of feedback filters (FBF0 through FBF7) operates on the preceding symbol decisions to provide the feedback signals for the summers. As with the FFEs, the inputs for the FBFs are shifted cyclically and provide a valid output only when the inputs correspond to the contents of the FBF 410 (FIG. 4), coinciding with the time window for the corresponding FFE. In practice, the number of feedback filter taps may be smaller than what is shown, or the number of array elements may be larger, so as to offer a longer window of valid output.

Figure 8:
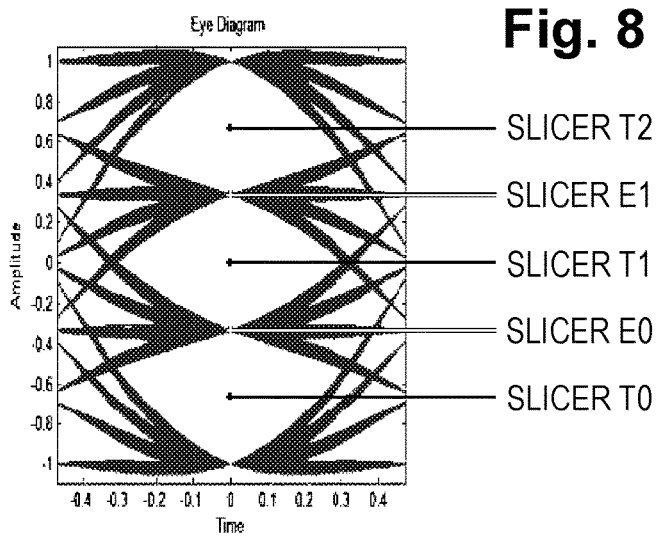
FIG. 8 is an illustrative PAM4 eye diagram.
Figure 9:
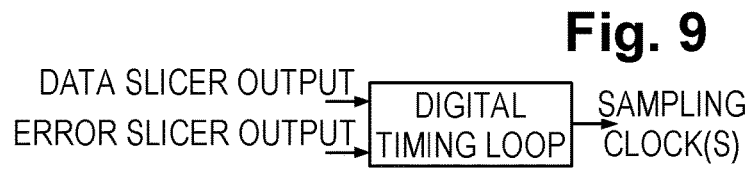
FIG. 9 is a block diagram of an illustrative timing loop.

As with the decision element of FIG. 4, the decision elements in FIG. 6 may each employ additional comparators to provide timing recovery info, coefficient training info, and/or precomputation to unroll one or more taps of the feedback filter. FIG. 8 shows an illustrative eye diagram for a PAM4 signal constellation with nominal signal values −1, −0.5, +0.5, and +1 representing the four symbols. In the illustrative eye diagram, the equalized signal values actually fall at −0.98, −0.36, +0.36, and +0.98, placing the optimal decision thresholds at T0=−0.67, T1=0, and T2=+0.67. Additional comparator thresholds are provided at E0=−0.36 and E1=+0.36 to provide error signals for coefficient training and timing recovery. As shown in FIG. 9, a digital timing loop combines the symbol decisions with the error signals to generate a sampling clock signal from which the CLK0 through CLK7 signals are derived. The digital timing loop can employ any of the widely known timing recovery techniques available in the academic and technical literature. Where the decision element includes, say, 12 or more comparators (e.g., when using precomputation to unroll taps of the feedback filter), the comparator outputs can be collectively used as a digital representation of the equalized signal value and used to implement the Mueller-Muller clock recovery technique.

Figure 10:
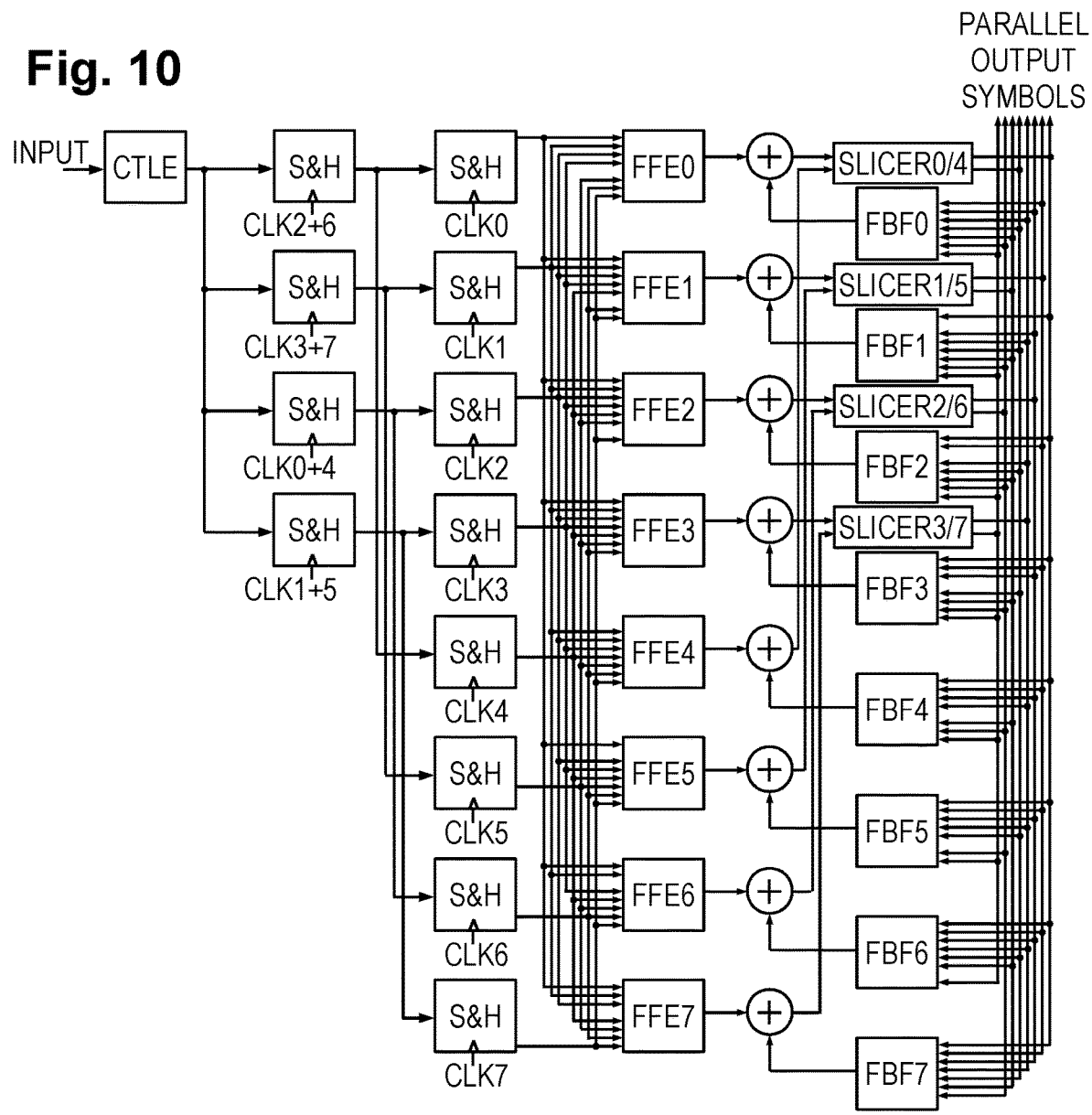
FIG. 10 is a block diagram of a second illustrative parallel mixed-signal equalizer.

The use of fast comparators in the decision elements may cause undesirably high power dissipation. Because each decision element is only being used part of the time, they may be multiplexed as shown in FIG. 10. Relative to FIG. 6, half of the decision elements have been eliminated and the other half are used twice in each cycle; their inputs are multiplexed and their outputs are demultiplexed and latched. Thus Slicer0/4 takes the place of Slicer0 and Slicer4, acting as Slicer0 while CLK4 is asserted and as Slicer4 while CLK0 is asserted.

Relative to FIG. 6, the receiver of FIG. 10 also includes intermediate S&H elements to buffer the signal from CTLE. Rather than directly branching out to the full array of S&H elements, which might cause capacitive loading of the signal line, the CTLE output signal branches to only the intermediate S&H elements. The outputs from each of the intermediate S&H elements branches to support two of the S&H elements in the original array. The intermediate S&H elements each employ a sum of two clock signals to operate twice as often as the S&H elements in the original array and thereby ensure their outputs are valid when needed.

Figure 11:
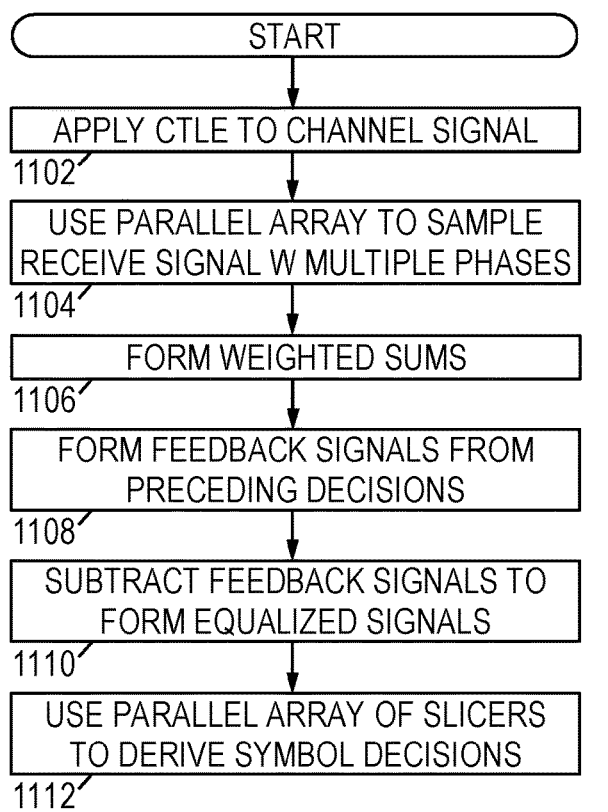
FIG. 11 is a flow diagram of an illustrative mixed-signal equalization method.

FIG. 11 is a flowchart of an illustrative equalization method which may be implemented by the receiver. In block 1102, the receiver filters the analog channel signal with a continuous time linear equalizer to form an analog receive signal. In block 1104, the receiver uses an array of sample and hold elements to each periodically sample the analog receive signal with different phases. In block 1106, the receiver uses an array of FFEs to form weighted sums of the held signals from the S&H element array. In block 1108, the receiver uses an array of FBFs to form feedback signals from preceding symbol decisions. In block 1110, the receiver uses an array of summers to subtract a respective feedback signal from each of the weighted sums, thereby providing a set of equalized signals that are periodically updated with different phases. In block 1112, the receiver uses an array of decision elements to derive symbol decisions from the equalized signals, and to output them in parallel.

Numerous alternative forms, equivalents, and modifications will become apparent to those skilled in the art once the above disclosure is fully appreciated. Though described in the context of an optical fiber link, the disclosed principles are applicable to receivers for all types of channels. The number of taps in the FFEs and FBFs, along with the number of parallel elements in each array, are design parameters that may be tailored to the channel or context for which the receiver is designed. It is intended that the claims be interpreted to embrace all such alternative forms, equivalents, and modifications that are encompassed in the scope of the appended claims.

What is claimed is:

1. An equalizer that comprises:
    an array of sample and hold elements, each sample and hold element in the array periodically sampling an analog receive signal with a respective phase to provide an associated held signal;
    an array of linear equalizers, each linear equalizer forming a periodically-updated weighted sum of the held signals from the array of sample and hold elements;
    an array of decision elements, each decision element deriving at least one sequence of symbol decisions based on at least one of the periodically-updated weighted sums, the resulting sequences of symbol decisions being output in parallel; and
    an array of feedback filters, each feedback filter forming a periodically-updated feedback signal to be combined with a respective weighted sum, the feedback signals being derived from the sequences of symbol decisions, and the decision elements operating on the combined signals to derive the sequences of symbol decisions.

2. The equalizer of claim 1, wherein each decision element is multiplexed to derive sequences of symbol decisions based on weighted sums from multiple linear equalizers in the array of linear equalizers.

3. The equalizer of claim 1, further comprising a second array of sample and hold elements to reduce loading of the analog receive signal by the first array of sample and hold elements.

4. The equalizer of claim 1, further comprising a continuous time linear equalizer that filters an analog input signal to form the analog receive signal.

5. The equalizer of claim 1, wherein each of the decision elements in the array of decision elements employs at least three thresholds to derive symbol decisions for a PAM4 signal constellation.

6. The equalizer of claim 5, wherein each of the decision elements further includes at least one error threshold to derive an error signal for timing recovery.

7. An equalization method that comprises:
    providing an array of sample and hold elements to each periodically sample an analog receive signal with a respective phase to yield a held signal;
    coupling the held signals to an array of linear equalizers, each linear equalizer combining the held signals to form a periodically-updated weighted sum;
    providing an array of decision elements to each derive at least one sequence of symbol decisions based on at least one of the periodically-updated weighted sums, the resulting sequences of symbol decisions arranged for parallel output; and
    configuring an array of feedback filters to each form a periodically-updated feedback signal to be combined with a respective weighted sum for input to one of the decision elements, the feedback signals being derived from the sequences of symbol decisions.

8. The method of claim 7, further comprising: multiplexing each decision element to derive multiple sequences of symbol decisions based on weighted sums from multiple linear equalizers in the array of linear equalizers.

9. The method of claim 7, further comprising arranging for a second array of sample and hold elements to reduce loading of the analog receive signal by the first array of sample and hold elements.

10. The method of claim 7, further comprising supplying the analog receive signal from a continuous time linear equalizer.

11. The method of claim 7, further comprising: configuring each of the decision elements to derive symbol decisions from a PAM4 signal constellation.

12. The method of claim 11, further comprising: configuring each of the decision elements to derive an error signal for timing recovery.

13. An equalization method that comprises:
    periodically sampling an analog receive signal with an array of sample and hold elements, each sample and hold element providing a held signal with a respective phase;
    forming weighted sums of the held signals with each linear equalizer in an array of linear equalizers;
    combining each of the weighted sums with a respective feedback signal to form combined signals;

deriving sequences of symbol decisions from each of the combined signals using an array of decision elements; and deriving the feedback signals from the sequences of symbol decisions with an array of feedback filters, each feedback filter forming a periodically-updated feedback signal.

14. The method of claim 13, further comprising: filtering an analog input signal with a continuous time linear equalizer to form the analog receive signal.

15. The method of claim 13, wherein each of the decision elements in the array of decision elements employs at least three thresholds to derive symbol decisions for a PAM4 signal constellation.

16. The method of claim 15, wherein each of the decision elements further includes at least one error threshold to derive an error signal for timing recovery.

* * * * *